United States Patent [19]

Humelsine et al.

[11] Patent Number: 5,694,540
[45] Date of Patent: Dec. 2, 1997

[54] AUTOMATED SOFTWARE REGRESSION TEST AND COMPILATION SYSTEM

[75] Inventors: James E. Humelsine, Neptune; Moses M. Ling, Warren; Carl H. Olson, III, Livingston; Pramod Warty, Freehold, all of N.J.

[73] Assignee: Lucent Technologies Inc., Murray Hill, N.J.

[21] Appl. No.: 587,060

[22] Filed: Jan. 16, 1996

Related U.S. Application Data

[63] Continuation of Ser. No. 356,805, Dec. 15, 1994, abandoned.

[51] Int. Cl.$^6$ .................................................... G06F 13/00
[52] U.S. Cl. ............................... 395/183.14; 395/183.09
[58] Field of Search ......................... 395/183.14, 183.22, 395/183.09, 183.08, 183.07, 183.01

[56] References Cited

U.S. PATENT DOCUMENTS

| | | | |
|---|---|---|---|
| 5,022,028 | 6/1991 | Edmonds et al. | 371/25.1 |
| 5,153,886 | 10/1992 | Tuttle | 371/67.1 |
| 5,157,782 | 10/1992 | Tuttle et al. | 395/575 |
| 5,218,605 | 6/1993 | Low et al. | 371/16.1 |

OTHER PUBLICATIONS

Hartmann & Robson, RETSET—Development of a Selective Revalidation Prototype Environment for Use in Software Maintenance, 1990 System Sciences, at 93.
Chen, TestTube: A System for Selective Regression Testing, 1994 Software Engineering International Conference, at 211.
Leung & White, A Study of Integration Testing and Software Regression at the Integration Level, 1990 Software Maintenance Conference, at 290.
Hartmann & Robson, Approaches to Regression Testing, 1988 Software Maintenance Conference, at 368.
Leung & White, Insights into Regression Testing, 1989 Software Maintenance Conference, at 60.
Leung & White, A Cost Model to Compare Regression Test Strategies, 1991 Software Maintenance Conference, at 201.
Laski & Szermer, Identification of Program Modifications and its Applications in Software Maintenance, 1992 Software Maintenance Conference, at 282.
Taha et al., An Approach to Software Fault Localization and Revalidation Based on Incremental Data Flow Analysis, COMPSAC 1989, at 527.
Harrold et al., A Methodology for Controlling the Size of a Test Suite, 1990 Software Maintenance Conference, at 302.
Rothermel & Harrold, Selecting Regression Tests for Object-Oriented Software, 1994 Software Maintenance Conference, at 14.
Automator QA (with Navigator) User Guide, by Direct Technology, Version QANUG1.0 (Jul. 1991).
Automator QA Developer Guide, by Direct Technology, Version QADG1.1 (1991).

*Primary Examiner*—Robert W. Beausoliel, Jr.
*Assistant Examiner*—Norman M. Wright
*Attorney, Agent, or Firm*—Frederick B. Luludis

[57] ABSTRACT

The regression testing of a recompiled main software program is provided a facility which performs a limited regression test that has the same level of testing as if the main program were tested using an expanded regression test that tests virtually all of the software modules forming the program. More particularly, if an error is found in the main program it is documented in a modification request which a programmer thereafter uses to track down and identify the software module(s) that needs to be modified to deal with the error. At that point, the programmer modifies the identified software module and also designs a current test program to test the recompiled program to determine if the error has been corrected and that the modification does not affect some other aspect of the program. The modified module and test program are then associated with an identifier identifying the associated modification request. The facility then locates all modification request identifiers respectively associated with prior modification made to the identified software module and executes the test programs associated with those modifiers as well as the current test program against the recompiled version of the main program.

17 Claims, 6 Drawing Sheets

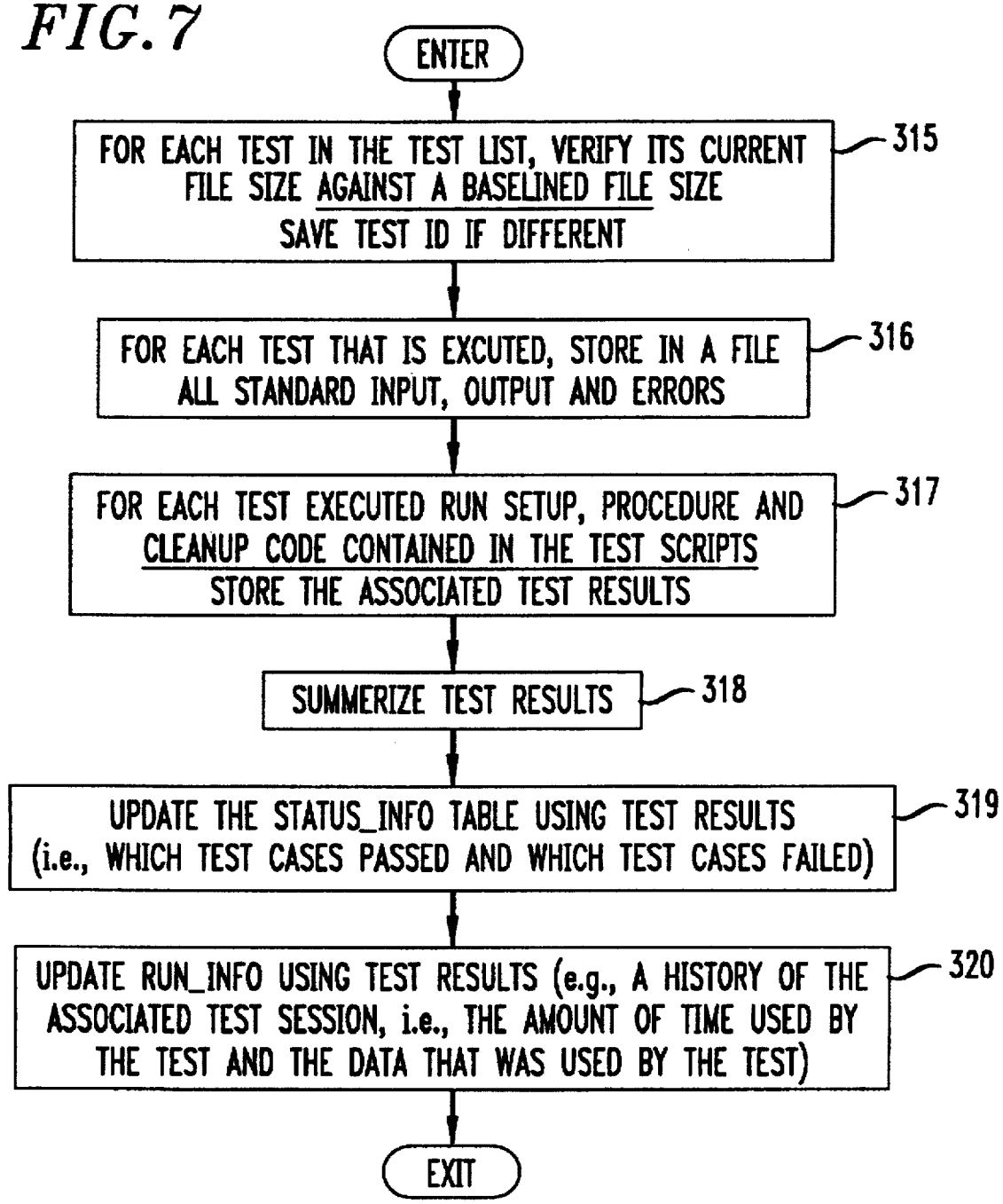

AUTOMATED SOFTWARE REGRESSION TEST AND COMPILATION SYSTEM

This application is a continuation of application Ser. No. 08/356,805, filed on Dec. 15, 1994, now abandoned.

TECHNICAL FIELD

The invention is related to the building and testing of a software program and particularly relates to regression testing of a software program.

BACKGROUND OF THE INVENTION

When a software developer (programmer) designs a new program or makes changes to an existing program, the programmer then typically subjects the program to a battery of regressions tests to ensure that the program (software) performs its intended function. The regression tests may also include the testing of other program modules which interface with the newly designed or changed program. We have noted that when the program is just one part of a much larger program, then a large number of regression tests are usually performed to ensure, for example, that the changed program does not render the larger program inoperable under certain conditions or cause the program to behave unexpectedly. It can be appreciated then that regression tests may constitute an appreciable portion of the development cycle, even when the cycle involves only changes to an existing program.

SUMMARY OF THE INVENTION

We have recognized that the same level, or degree, of testing a main program using a large number of regression tests may be achieved, in accord with the invention, using a limited number of regression tests. More particularly, when an error is found in the main program it is documented in a modification request which a programmer thereafter uses to track down and identify the software module(s) that need to be modified to eliminate the error. At that point, the programmer modifies the identified software module(s) to deal with the error and then designs a current test program that may be applied to the main program to determine if the error has been corrected. The modified module and test program are then associated with an identifier identifying the associated modification request. For each such identified modified module, the system locates all modification request identifiers respectively associated with prior modification made to the identified software module and executes the test programs associated with those modifiers as well as the current test program against a recompiled version of the main program, thereby achieving a limited, but thorough testing of the recompiled main program.

BRIEF DESCRIPTION OF THE DRAWINGS

In the drawing:

FIGS. 4–7 illustrate in block diagram form the program which implements the principles of the invention in the test management program of FIGS. 2 and 3.

GENERAL DESCRIPTION

Figure 1:
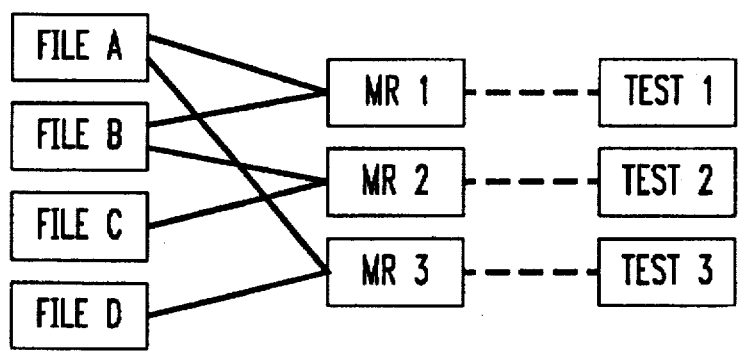
FIG. 1 illustrates generally the way in which limited regression tests are performed in accordance with the principles of the invention.

Assume that a program which performs a number of functions has been designed and is currently in operation. Also assume that during such operation a number of errors in a section of the program are uncovered and documented. Herein such documentation includes what we refer to as a Modification Request (MR) which identifies the error. Also assume that the identified section includes software files (modules) A and B associated with a modification request designated MR 1, as shown in FIG. 1. Modules A and B are arbitrary and depend upon the modification that is described in the MR. The association between the software modules and the MR is not made until the software modules are updated, as described below. Under such conditions, a programmer may modify source files (programs) A and B to correct the software errors ("bugs") identified in MR 1. The programmer also designs a test, e.g., TEST 1, that may be applied to a master program when it is recompiled to substitute the modified source files A and B for the prior versions of those files. TEST 1, more particularly, is designed to test the master program to determine if the errors documented in MR 1 have been corrected. (Herein, a MR is taken to mean a mechanism that is used to identify, document and track changes to a software program. A MR is associated with each source-code change, and may represent the correction of a software problem, an enhancement, or a feature that is to be added to or removed from the software program.)

Assume at this point that MR 2 is issued to document additional software errors found in source file B and software errors found in source file C. Similarly, a programmer modifies source files B and C to correct the errors documented in MR 2 and designs a TEST 2 that may be applied to a recompiled version of the master program as a regression test to determine if the errors documented in MR 2 have been corrected. However, in accord with an aspect of the invention, both TEST 1 and TEST 2 are applied in that order to the recompiled master program as a limited regression test. The reason for applying both tests is to determine if the latest modification made to source file B affects adversely a previous modification made thereto and determine if the latest modification to source files B and C corrects the software errors documented in MR 2.

A similar case is illustrated for MR 3 which documents errors found (uncovered) in source files A and D. When those source files have been modified to deal with the errors documented in MR 3 and the master program has been recompiled to include those modifications, then TEST 1 and 3 are applied to the latest version of the master program as a limited regression test. That is, TEST 1 verifies that the latest modification made to source file A does not affect adversely the functionality modified in response to the errors documented in MR 1; and TEST 3 determines if the latest modifications made to source files A and D correct the errors identified in MR 3 and do not affect adversely any other functionality of the master program. Note that TEST 2 has not been applied to the master program, since it is recognized that MR 3 does not involve file B or file C, and, therefore, the master program need only be subjected to a limited regression test involving only Tests 1 and 3. Thus, in accord with the claimed invention, all of the test cases associated with the source files that have changed (associated with MRs), and only those test cases, are invoked to regression test the recompiled master program. Advantageously, then, the user is highly confident that as a result of the limited regression test the new functionality as well as preexisting functionality operate as expected, without invoking unnecessary test cases as is done in prior art arrangements, which (a) typically perform a full regression test, (b) perform tests selected by a user, which tends to be incomplete testing or (c) as in some cases, where a modification is minimal, perform no regression test.

DETAILED DESCRIPTION

Figure 2:
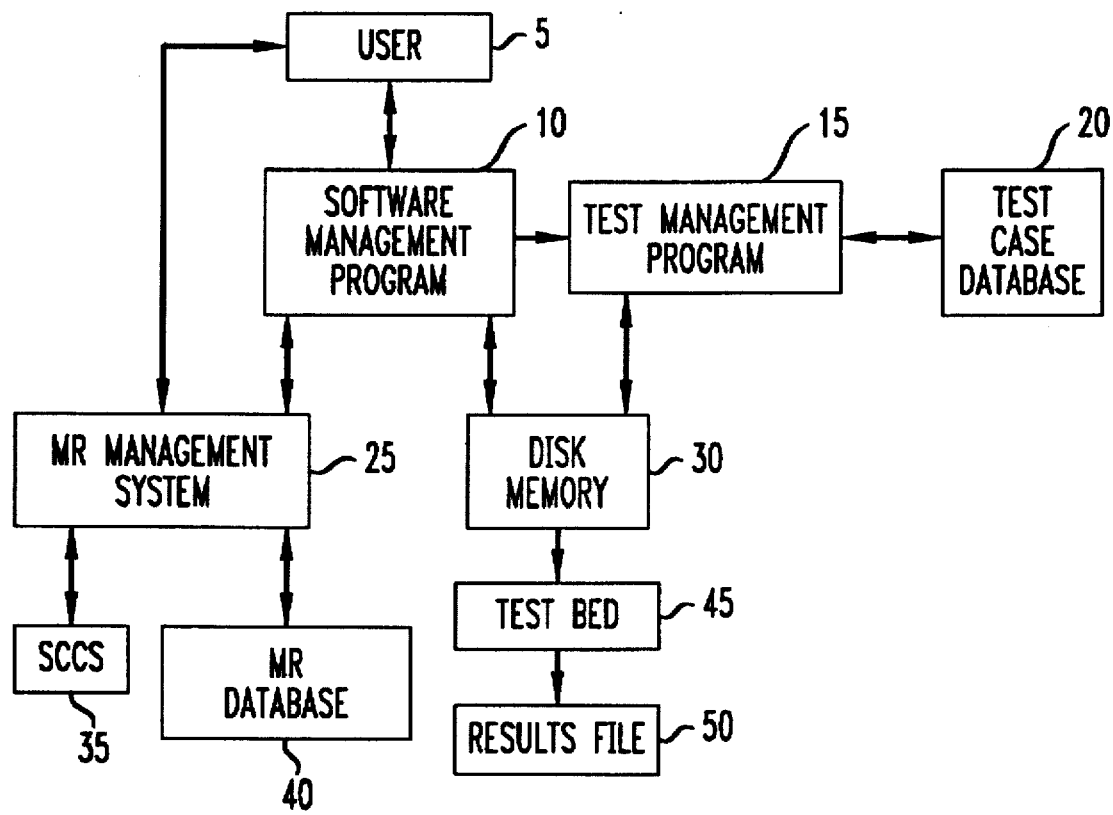
FIG. 2 is a broad block diagram of a system in which the principles of the invention may be practiced.
Figure 3:
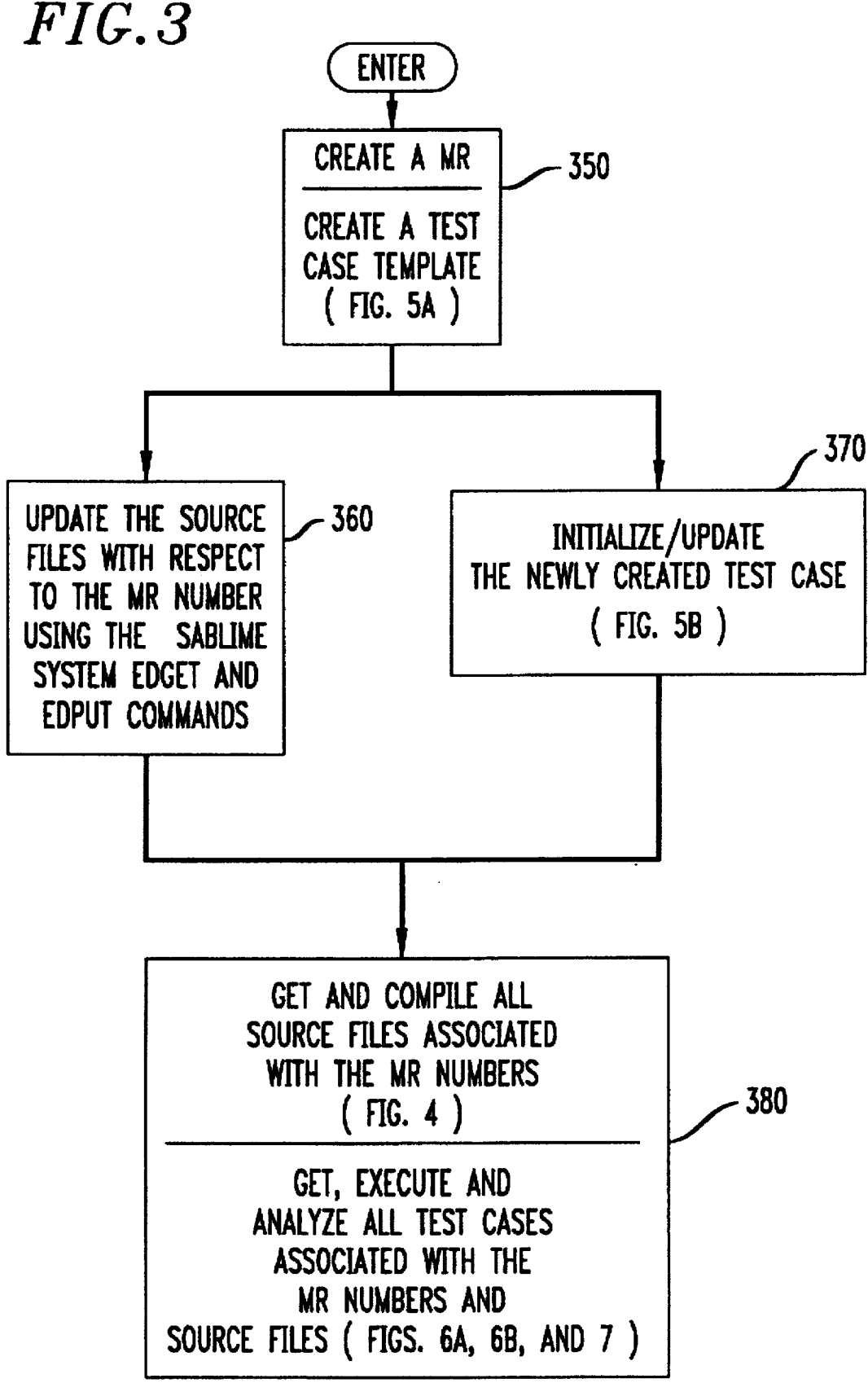
FIG. 3 is a high level block diagram of the software management and test management programs of FIG. 2.
Figure 5A:
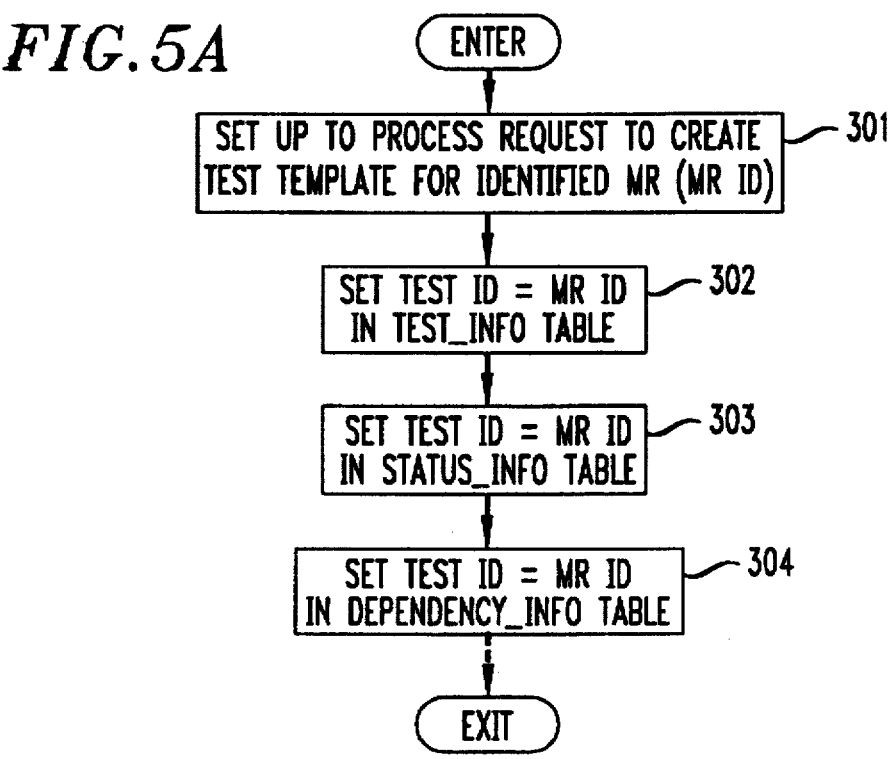

Turning now to FIG. 2, there is shown software development and test system 100 which incorporates the principles of the invention. Specifically, assume that an error is found in a master or application program or that a new feature is to be added to the program. In either case then, the user 5 interacts with software management program 10, which, in turn, interacts concurrently with MR management system 25 to create an MR to document the error or feature enhancement. System 25 associates the MR with an identifier, e.g., the number 250, and stores the resulting MR in database 40. (In an illustrative embodiment of the invention program 10 may be the SIMP program commercially available from AT&T and system 25 may be implemented using, for example, the SABLIME (registered trademark of AT&T Corp.) computer programs also commercially available from AT&T, in which both programs run under the UNIX operating system. A high level flow chart pointing out the functions respectively implemented by such programs is shown in FIG. 3. The individual programs are also referenced in FIG. 3. At that point the MR is assigned to a particular software developer, e.g., user 5, to correct the error documented in the MR or develop the software that implements the enhancement. In addition, program 10 causes test management program to create a test template (block 350, FIG. 3) and associate the template with the pertinent MR identifier, i.e., the MR number 250. As illustrated in FIG. 5A, the relationship between an MR and test case is established when program 15 is entered at block 301 to respond to program 10. Program 15 (block 302, 303 and 304) respectively sets the identity of the test in each of the noted tables, which are stored in database 20, to the identity of the associated MR, e.g., MR 250. Note, if the current test program depends on other test program(s) created previously, then an entry is made in database 20. This entry is thereafter accessed during a test extraction phase when a so-called "transitive test closure" determination is made.

It is seen from FIG. 3 that the process of updating the source code (block 360) is done parallel with the updating of the test code (block 370). The developer/user 5 (block 360), in response to being assigned to deal with the MR, determines which software files need to be changed and interacts with system 25 to obtain copies of those files. System 25, in turn, interacts with Source Code Control System (SCCS) 35 to obtain the copies and supply them to the user 5. That is, the original program and all versions thereof are managed by and stored in SCCS 35. Such management includes a software archiving function in which SCCS 35 tracks and stores in database 40 incremental changes made in the original program and the location, date and time of each such incremental change that is made to the original program. Accordingly, system 25 interacts with SCCS 35 to obtain copies of the identified files and supply them to user 5. In addition, system 25 stores information that associates the files that are supplied to the user with the pertinent MR, e.g., MR 250, in MR database 40.

(It is noted that, in an illustrative embodiment of the invention SCCS 35 is incorporated in the UNIX operating system, which is available from UNIX System Laboratories Inc.)

Assume at this point that the developer/user 5 has modified (updated) the files in accord with the specification documented in the associated MR 250. The developer/user 5 then supplies the modified files to system 25 using appropriate commands recognized by system 25, e.g., the SABLIME system command "edput". System 25 responsive thereto supplies the modified file(s) to SCCS 35, which, in turn, stores the changes (modifications) that user 5 made to the files in its associated memory (not shown). System 25 then stores a record identifying an association between the identity of the changed files and the associated MR 250 in database 40.

Figure 5B:
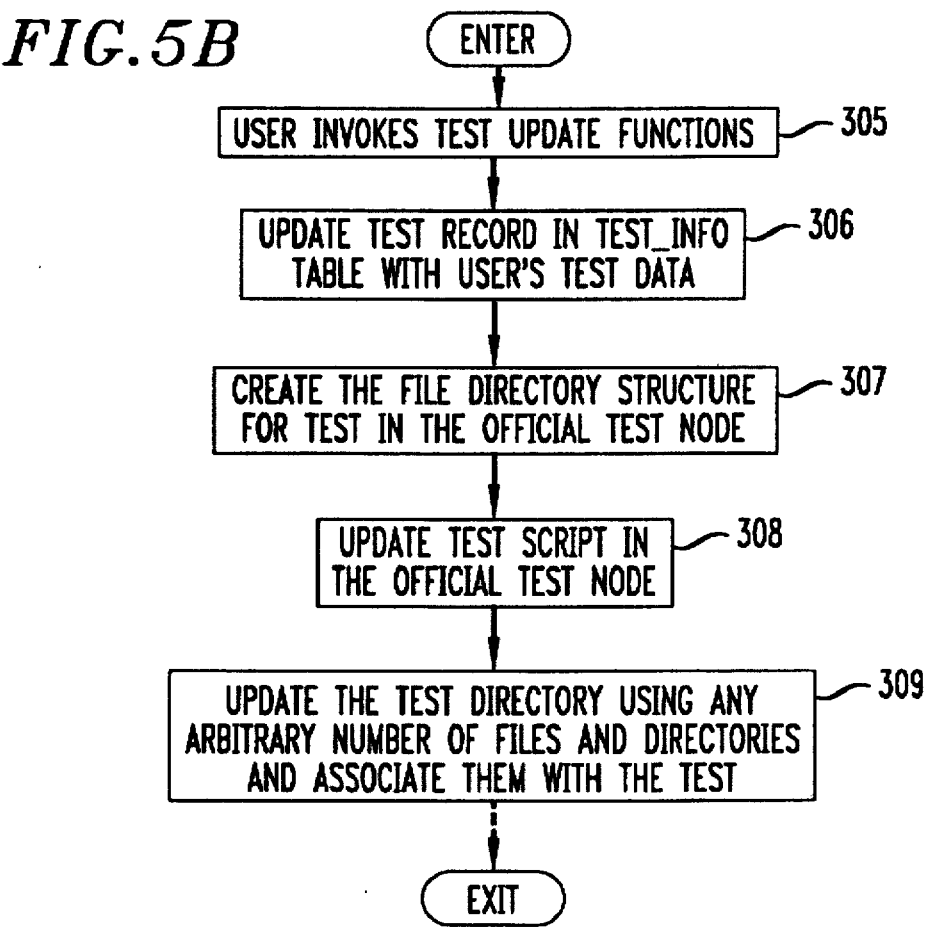

As mentioned above, the updating of the test code (block 370) in test case database 20 is done in parallel to the updating of the source code. An expanded version of block 370 is illustrated in FIG. 5B. Specifically, when entered, (block 305) test program 15 interacts with the user for the purpose of receiving test information from the user, e.g., the test code (vectors) that will be used to test the program change/update identified by the associated MR 250. Program 15 uses the entered information to generate a test script and then proceeds to block 306 where it updates the testinfo table using test code that the user entered at block 305. The program (block 307) then creates a hierarchy of directories starting from a master directory to a directory that will contain the test code entered by the user, in which the creation of the directories is based on the memory (disk) locations and identities of the tests that were stored in database 20 at blocks 302 through 304. Program 15 then proceeds to block 308 where it stores the test script file in a "leaf" directory (created at block 307). At block 309 the program examines a test directory containing the user's test code and possibly other files and/or subdirectories supporting the test code, i.e., programs referenced (invoked) by the test code. Program 15 then stores a copy of such files and/or subdirectories in the leaf directory. The program 15 then exits as noted by the dashed line which also represents a re-entry of the program at the next block of the program.

Figure 4:
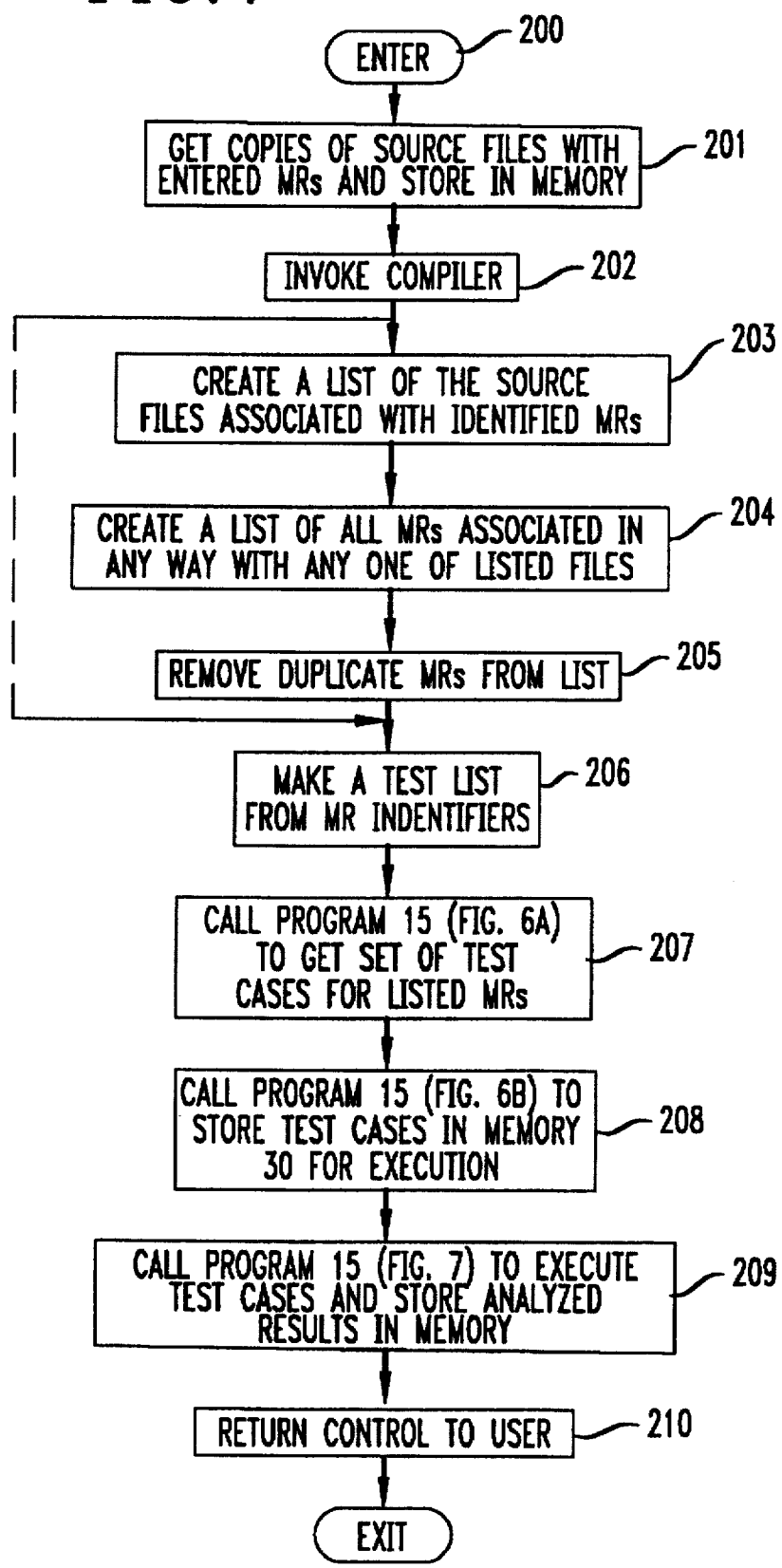

At this point, the source files are gathered and compiled (block 380, FIG. 3). This action is initiated when the user 5 sends a request to program 10 to assemble the master/application program including the changes that were made thereto to satisfy MR 250, in which a previous version of the master (or application) program is stored in disk memory 30 (FIG. 2). Referring to FIG. 4, program 10 (block 201), in response thereto, enters system (program) 25, and, in doing so, requests that all updated (modified) files associated with MR 250 be stored in disk 30 in place of the previous versions of those files. System 25, in response to the request, obtains the identities of all of the files (source code) associated with MR 250 from database 40. System 25 then (a) presents those identities to SCCS 35 to obtain copies of the corresponding modified files and (b) stores them in disk 30.

Once the files containing the source code have been stored in database 30, then program 10 (block 202) invokes a compiler (not shown) to create object and executable files from the source codes files stored in disk 30.

After the master (or application) program has been recompiled to include the latest version of the modified files, then the master program may be tested using a test case designed to test only the changes associated with a particular MR, e.g., MR 250 (in which case, the program bypasses blocks 203, 204 and 205 and proceeds to block 206 as represented by the dashed line) or a more complete test involving the latter MR as well as all other MRs associated with other modified source files. For example, a simple test case (block 206) typically involves invoking test functionality associated with specific MRs, e.g., MR 3 (FIG. 1), in which only TEST 3 is invoked. Accordingly, program 10 (block 206) makes a list of the MRs that need to be tested and reformats the list so that it is in form expected by program 15. (A complete regression test would involve all of the MRs associated with the modified source files, as mentioned above.)

The user, more particularly, may invoke all test functionality associated with source files that are associated in any way with the specified MRs, e.g., files A and D and thus Tests 1 and 3 are associated with MR 3. If that is the case, then program 10 (block 203) interacts with system 25 to obtain the identities (names) of all files associated with each of the listed MRs, e.g., MR 250. System 25, in response thereto, gets such identities from database 40. For each of the identified files, program 10 (block 204) sends a request to system 25 requesting copies of all MRs that are associated with the identified file. System 25, in turn, obtains all such MRs from database 40 and supplies them to program 10. (Note that system 25 is able to identify the MRs as a result of invoking the SABLIME system edput command.) As a result of the foregoing, program 10 obtains a list of all MRs that have been associated with the modified source files and processes the list to remove duplicate entries (block 205).

Figure 6A:
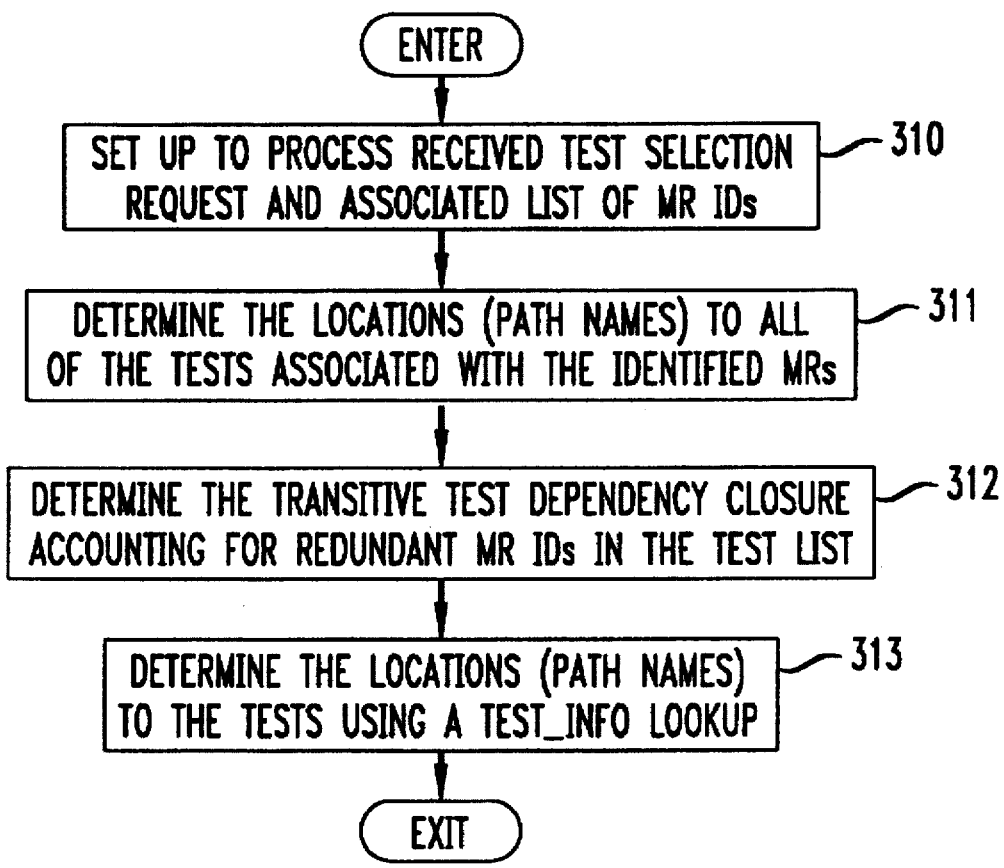

Irrespective of whether a simple test or a more complete regression test has been requested, program 10 (block 207) sends the resulting list of MRs to program 15 (FIG. 6a, block 310). In particular, program 15 (block 311) then scans database 20 to identify the pathnames (location) to all test cases respectively associated with the MRs contained in the list of MRs. The program then (block 312) determines the transitive closure of test dependencies listed in a dependency table stored in database 20 (minus duplicates thereof) for each of the tests identified in the list of MRs. Program 15 then (block 313) scans database 20 to determine the location at which each of the dependent tests identified at block 312 is stored. Program 15 then exits by passing control to program 10.

Figure 6B:
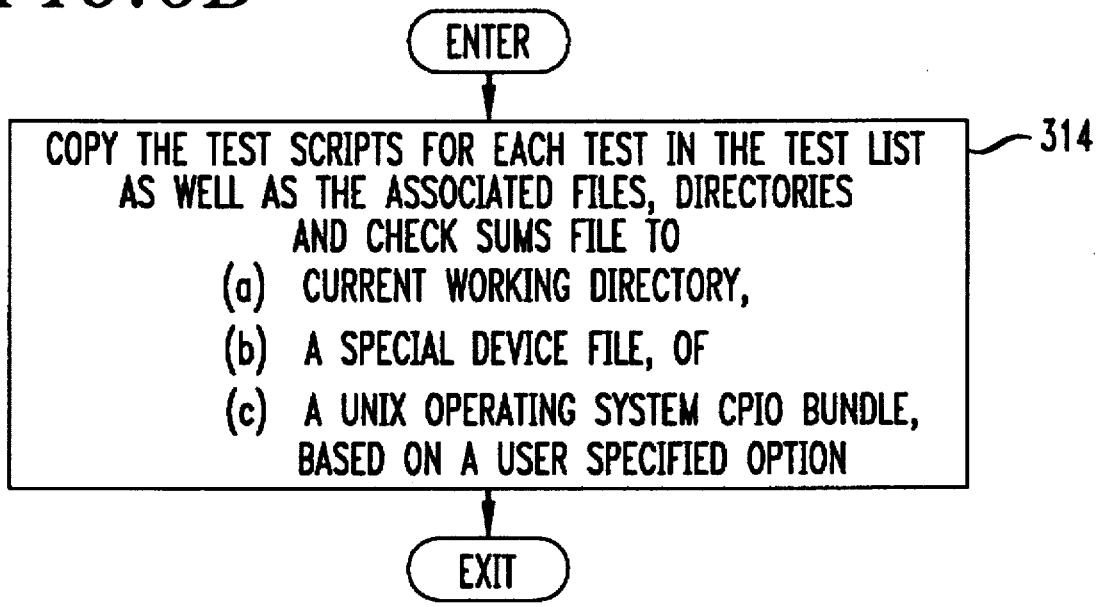

Program 10, upon being reentered at this point (block 208), instructs program 15 to load the selected test cases in disk 30, thereby returning control to program 15 at block 314, FIG. 6B.

At block 314, program 15 copies each of the files whose location was identified at blocks 311 through 313 to a disk 30 directory, i.e. the user's present working directory. The program also stores the list of test locations in a file under the latter directory as well as the size of the files noted in the list. Program 15 then exits by passing control to program 10 (block 209, FIG. 4), which in turn, instructs program 15 to execute (apply) the test cases stored in disk 30 against test bed 45 (FIG. 2) and to summarize the results obtained from running the test cases as shown in FIG. 7. (In an illustrative embodiment of the invention, test bed 45 may be the recompiled master, or application program.)

Program 15 at block 315 (FIG. 7) compares the size of each file identified in the test list stored on disc 30 with the file size determined at block 314. Based on the compare, the program saves the identity of each file whose size has changed. For each test on the list that is to be invoked, the program (block 316) sets up to "capture" a copy of the input and output that occurs during the execution of each of the tests identified in the test list. At block 317, program 15 applies the test code defined in all of the test scripts identified in the test list against test bed 45 and stores the results of each such test in a results file 50 (FIG. 2). Such results may include, for example, which tests passed and which tests failed. The program (block 318) then appends a summary of the results to the result file. Program 15 (block 319) then updates a Status table in database 20 using the status of each file, e.g., which test cases passed and which test cases failed. Program 15 (block 320) then updates the Run table in database 20 to reflect certain statistics associated with the execution of each test file, e.g., the amount of time it took a file to run (execute), the date the file was run as well as other similar statistics. Program 15 then exits by returning control to program 10 which, in turn, exits (block 210, FIG. 4) by returning control to user 5. At that point the user may examine the results of the limited regression test to determine if the test(s) were successful or need to be redone.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A method of performing a regression test of a recompiled program formed from a plurality of software modules, said method comprising the steps of associating a software error found in said program with a modification request and associating said modification request with a respective identifier, responsive to associating said error with at least one of said software modules, (a) changing said one software module to correct said error, (b) designing a current test program to test said one software module to verify that the error contained therein has been corrected and (c) associating said current test program and said changed software module with said identifier, said one software module being associated with prior changes associated with respective identifiers and respective test programs, recompiling said program using said changed one software module and the other ones of said plurality of software modules, determining all modification request identifiers respectively associated with prior changes made to said one software module and executing the test programs respectively associated with such prior identifiers as well as the current test program against said recompiled program.

2. The method of claim 1 wherein the step of executing includes the step of automatically executing said test programs in the order that they were created.

3. The method of claim 1 wherein the step of executing includes the step of storing the results of each test program in a memory file and supplying said file to a user.

4. The method of claim 3 wherein the step of storing includes the step of analyzing said results and storing the results of such analysis in said file.

5. The method of claim 4 wherein said analysis includes identifying which tests of said test program passed or failed.

6. The method of claim 1 further comprising the step of determining a transitive closure of test dependencies for each of said test programs that is executed.

7. A method of performing a regression test of a recompiled program formed from a plurality of software modules, said method comprising the steps of documenting software errors found in said program in respective modification requests and associating said modification requests with respective identifiers, identifying the software modules respectively containing said errors as a function of the documentation contained in the respective modification requests, responsive to each said identification, (a) changing the associated identified software module to correct the error contained therein, (b) designing a current test program to test the software module after it has been changed to verify that the error contained therein has been corrected and (c) associating said test and said changed software module with the identifier associated with the modification request used to identify the error, recompiling said program using said software modules which have been changed and those of said plurality of software modules which did not change, determining all modification request identifiers respectively associated with prior changes made to each of said identified software modules and executing only the test programs respectively associated with such prior identifiers as well as each current test program against said recompiled program.

8. The method of claim 7 wherein the step of executing includes the steps of identifying prior test programs associated with a changed software module, and automatically executing the identified test programs based on the order in which their associated identifiers were created and then executing the associated current test program.

9. The method of claim 7 wherein the step of executing includes the step of storing the results obtained from executing a test program in a memory file and supplying said file to a user.

10. The method of claim 9 wherein the step of storing includes the step of analyzing said results and storing the results of such analysis in said file.

11. The method of claim 10 wherein said analysis includes identifying which tests of said test program passed of failed.

12. A system for regression testing a recompiled program formed from a plurality of software modules, said system comprising means, responsive to identifying a software error in said program, for documenting said software error in a modification request and associating said modification request with a respective identifier, means, responsive to such documentation, for associating said error with at least one of said software modules, means, operative as a result of said associating for (a) modifying said one software module to correct said error, (b) designing a current test program to test said modified software module to verify that the error contained therein has been corrected and (c) associating said current test program and said changed software module with said identifier, means for recompiling said program using said changed modified software module and the other ones of said plurality of software modules, and means for determining all modification request identifiers respectively associated with prior modifications made to said modified software module and executing the test programs respectively associated with such prior identifiers as well as the current test program against said recompiled program.

13. The system set forth in claim 12 wherein said means for executing includes means for automatically executing said test programs in the order that they were created.

14. The system set forth in claim 12 wherein said means for executing includes means for storing the results of each test program in a memory file and supplying said file to a user.

15. The system set forth in claim 14 wherein said means for storing includes means for analyzing said results and storing the results of such analysis in said file.

16. The system set forth in claim 15 wherein said analysis includes identifying which tests of said test program passed or failed.

17. The system set forth in claim 12 further comprising means for determining a trasitive closure of test dependencies for each of said executed test programs.

* * * * *